US012803406B2

(12) United States Patent
Sato et al.

(10) Patent No.: US 12,803,406 B2
(45) Date of Patent: Nov. 17, 2026

(54) INTERACTION FORCE CONTROL DEVICE, ELECTROMAGNETIC BRAKE INCLUDING THE SAME, AND ROTARY ELECTRIC MACHINE INCLUDING THE SAME

(71) Applicant: SHINANO KENSHI CO., LTD., Ueda (JP)

(72) Inventors: Eishin Sato, Nagano (JP); Alexander Cooper, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 157 days.

(21) Appl. No.: 18/786,002

(22) Filed: Jul. 26, 2024

(65) Prior Publication Data

US 2025/0062670 A1 Feb. 20, 2025

(30) Foreign Application Priority Data

Aug. 18, 2023 (JP) ................................ 2023-133468
Jun. 25, 2024 (JP) ................................ 2024-101948

(51) Int. Cl.
*H02K 49/10* (2006.01)
*H02K 1/14* (2006.01)
(Continued)

(52) U.S. Cl.
CPC ............... *H02K 49/10* (2013.01); *H02K 1/14* (2013.01); *H02K 1/16* (2013.01); *H02K 1/17* (2013.01); *H02K 1/2706* (2013.01)

(58) Field of Classification Search
CPC .......... H02K 1/14; H02K 1/16; H02K 1/2706; H02K 1/17; H02K 49/10
See application file for complete search history.

(56) References Cited

U.S. PATENT DOCUMENTS 3,984,711 A * 10/1976 Kordik .................. H02K 37/20 310/154.07
4,712,028 A * 12/1987 Horber .................. H02K 41/03 310/171
(Continued)

FOREIGN PATENT DOCUMENTS

CN 108429394 A 8/2018
CN 113346816 A 9/2021
(Continued)

OTHER PUBLICATIONS

Jul. 1, 2025 Office Action issued in Japanese Patent Application No. 2024-101948.
(Continued)

*Primary Examiner* — Leda T Pham
(74) *Attorney, Agent, or Firm* — Oliff PLC

(57) ABSTRACT

An interaction force control device includes a first element including a first permanent magnet and a second element including a second permanent magnet and a coil. A relative positional relationship between the first and second elements is variable. Mutual magnetic force of the first and second permanent magnets generates interaction force between the first and second elements. Magnetic force of the second permanent magnet is capable of increasing and decreasing in accordance with magnetic force generated by the coil. The interaction force is controlled by changing the magnetic force generated by the coil.

17 Claims, 14 Drawing Sheets

(51) Int. Cl.

| | |
|---|---|
| ***H02K 1/16*** | (2006.01) |
| ***H02K 1/17*** | (2006.01) |
| ***H02K 1/2706*** | (2022.01) |

(56) References Cited

U.S. PATENT DOCUMENTS

| | | | | |
|---|---|---|---|---|
| 5,723,921 | A | 3/1998 | Sugiura | |
| 6,867,561 | B1 | 3/2005 | Pollock et al. | |
| 8,076,811 | B2 * | 12/2011 | Zhu ........................ | H02K 21/44 310/154.22 |
| 11,411,444 | B2 * | 8/2022 | Lin ........................ | H02K 37/14 |
| 2009/0072675 | A1 | 3/2009 | Kanehara | |
| 2015/0252869 | A1 | 9/2015 | Grand et al. | |

FOREIGN PATENT DOCUMENTS

| | | | |
|---|---|---|---|
| JP | H07-8126 | B2 | 1/1995 |
| JP | H09-289766 | A | 11/1997 |
| JP | H10-341590 | A | 12/1998 |
| JP | 2001-054273 | A | 2/2001 |
| JP | 2003-153513 | A | 5/2003 |
| JP | 2003-153515 | A | 5/2003 |
| JP | 2015-171319 | A | 9/2015 |
| TW | 200824258 | A | 6/2008 |
| WO | 2006/123668 | A1 | 11/2006 |

OTHER PUBLICATIONS

Jul. 30, 2025 Office Action issued in Taiwanese Patent Application No. 113129193.

* cited by examiner

INTERACTION FORCE CONTROL DEVICE, ELECTROMAGNETIC BRAKE INCLUDING THE SAME, AND ROTARY ELECTRIC MACHINE INCLUDING THE SAME

CROSS-REFERENCE TO RELATED APPLICATION

This application is based upon and claims the benefit of priority of the prior Japanese Patent Application No. 2023-133468, filed on Aug. 18, 2023, and the prior Japanese Patent Application No. 2024-101948, filed on Jun. 25, 2024, the entire contents of which are incorporated herein by reference.

BACKGROUND

(i) Technical Field

The present disclosure relates to an interaction force control device, an electromagnetic brake including the same, and a rotary electric machine including the same.

(ii) Related Art

Japanese Unexamined Patent Application Publication No. H10-341590 discloses a technique for generating a brake torque for maintaining a rotating state of a rotor by energization.

The above technique is low in versatility because it only generates a brake torque by energization.

SUMMARY

According to an aspect of the present disclosure, there is provided an interaction force control device including: a first element including a first permanent magnet; and a second element including a second permanent magnet and a coil, wherein a relative positional relationship between the first and second elements is variable, mutual magnetic force of the first and second permanent magnets generates interaction force between the first and second elements, magnetic force of the second permanent magnet is capable of increasing and decreasing in accordance with magnetic force generated by the coil, and the interaction force is controlled by changing the magnetic force generated by the coil.

DETAILED DESCRIPTION

[Configuration of Interaction Force Control Device]

Figure 1:
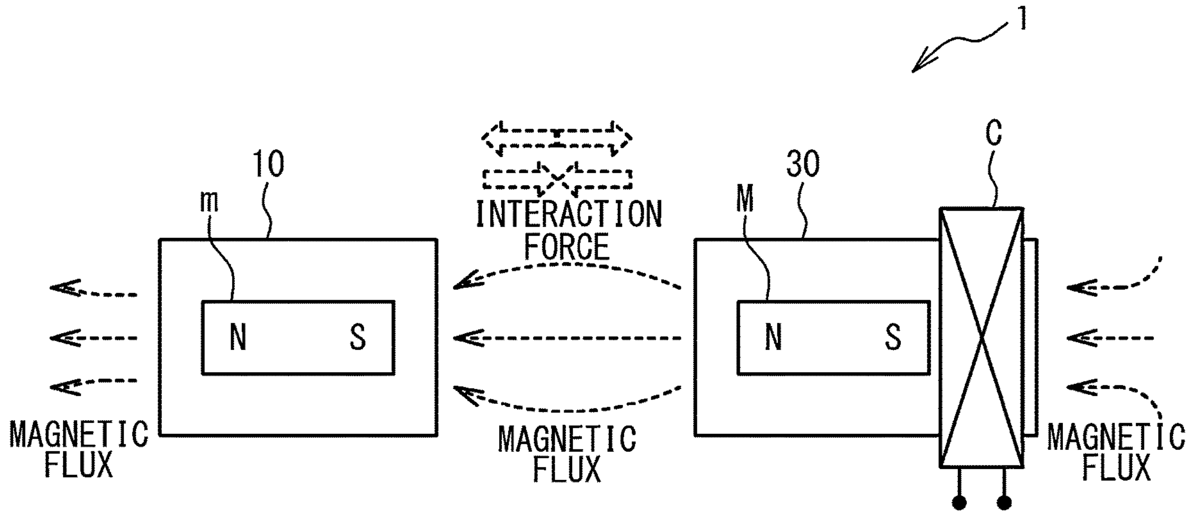
FIG. 1 is a conceptual view of an interaction force control device.

FIG. 1 is a conceptual view of an interaction force control device 1. The interaction force control device 1 includes elements 10 and 30. The element 10 includes a permanent magnet m. The element 30 includes a coil C and a permanent magnet M. The element 10 is an example of a first element. The element 30 is an example of a second element. The permanent magnet m is an example of a first permanent magnet. The permanent magnet M is an example of a second permanent magnet. The elements 10 and 30 are provided such that the relative positional relationship is changeable. For example, one of the elements 10 and 30 is fixed, and the other is supported by a guide rail or the like so as to be movable toward and away from the one of the elements. The permanent magnet m and the permanent magnet M are arranged such that different polarities face each other. Specifically, the S pole of the permanent magnet m and the N pole of the permanent magnet M face each other. The coil C is wound around the permanent magnet M with a direction in which the S pole and the N pole of the permanent magnet M are arranged as a central axis. In the non-energized state of the coil C, interaction force is generated between the elements 10 and 30 by the mutual magnetic force of the permanent magnets m and M. In the example of FIG. 1, the interaction force is attraction force.

By energizing the coil C to be in an energized state, the magnetic force of the permanent magnet M is weakened by the magnetic force generated by the coil C. This reduces the attraction force, which is interaction force. Further, by increasing the exciting current to the coil C, the magnetic force generated by the coil C and the magnetic force of the permanent magnet M is canceled. This allows the interaction force to be eliminated. Further, by increasing the energization current to the coil C, repulsive force is generated as the interaction force by the magnetic force generated by the coil C. Further, by switching the direction of the energization current to the coil C to bring the coil C into the reverse energized state, the attractive force as the interaction force is increased by the magnetic force generated by the coil C. In this way, the direction and magnitude of the energization current to the coil C are controlled to change the magnetic force generated by the coil C, whereby the interaction force is controlled in various ways. Therefore, the mechanism of the interaction force control device 1 is used in various devices, and the interaction force control device 1 is good in versatility. For example, the mechanism of the interaction force control device 1 is used for an electromagnetic brake or a rotary electric machine. Note that FIG. 1 is intended to explain the concept of the interaction force control device 1, and practical design limitations such as magnetic short-circuiting of the permanent magnet M and the permanent magnet m are not taken into consideration.

The element 10 may be a member made of a magnetic material such as an iron core without the permanent magnet m. In this case, attraction force due to magnetic force acts between the element 10 and the permanent magnet M.

This attraction force is reduced or eliminated by the magnetic force generated by the coil C.

[Configuration of Rotary Electric Machine]

Figure 2:
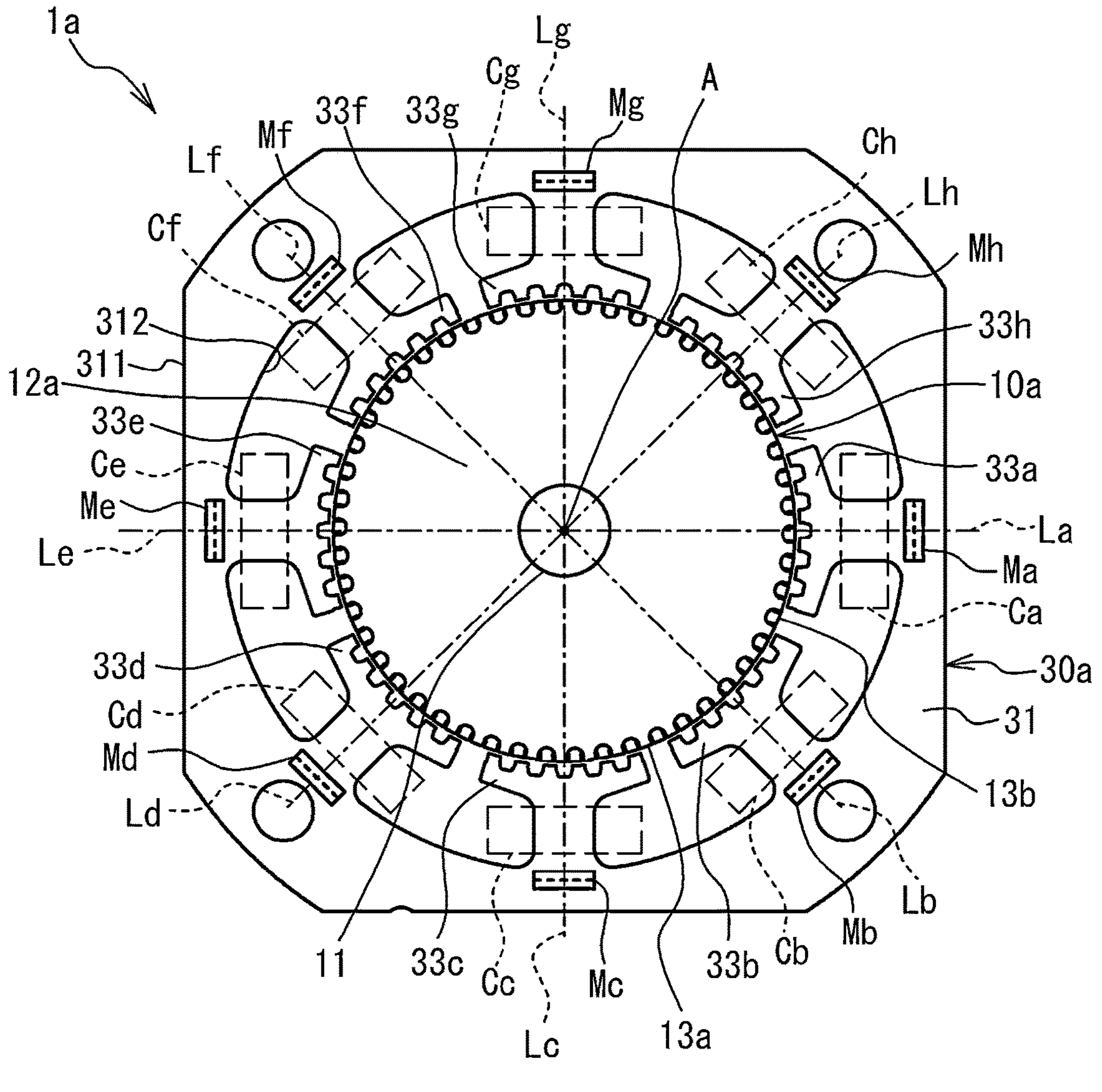
FIG. 2 is an external view of a rotary electric machine.

FIG. 2 is an external view of a rotary electric machine 1*a*. The rotary electric machine 1*a* is a hybrid stepper motor. The rotary electric machine 1*a* has a function of an electromagnetic brake using the interactive force control device. The rotary electric machine 1*a* includes a rotor 10*a*, a stator core 30*a*, coils Ca to Ch, and permanent magnets Ma to Mh. FIG. 2 illustrates an axial center A which is a central axis of rotation of the rotor 10*a*. Therefore, FIG. 2 is a view of the rotary electric machine 1*a* as viewed in the direction of the axial center A. The rotor 10*a* is of the inner rotor type.

Figure 3:
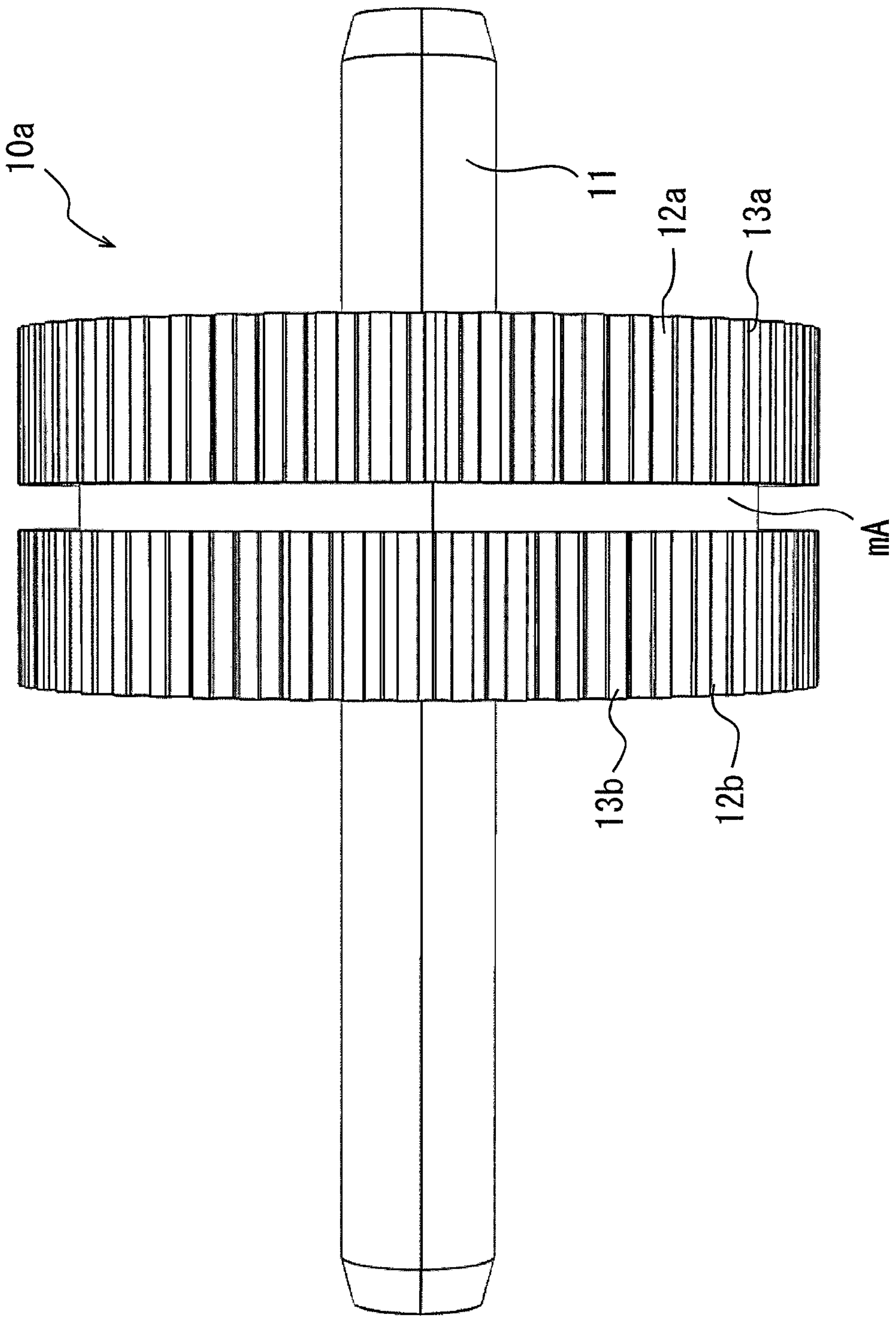
FIG. 3 is a side view of a rotor.
Figure 4:
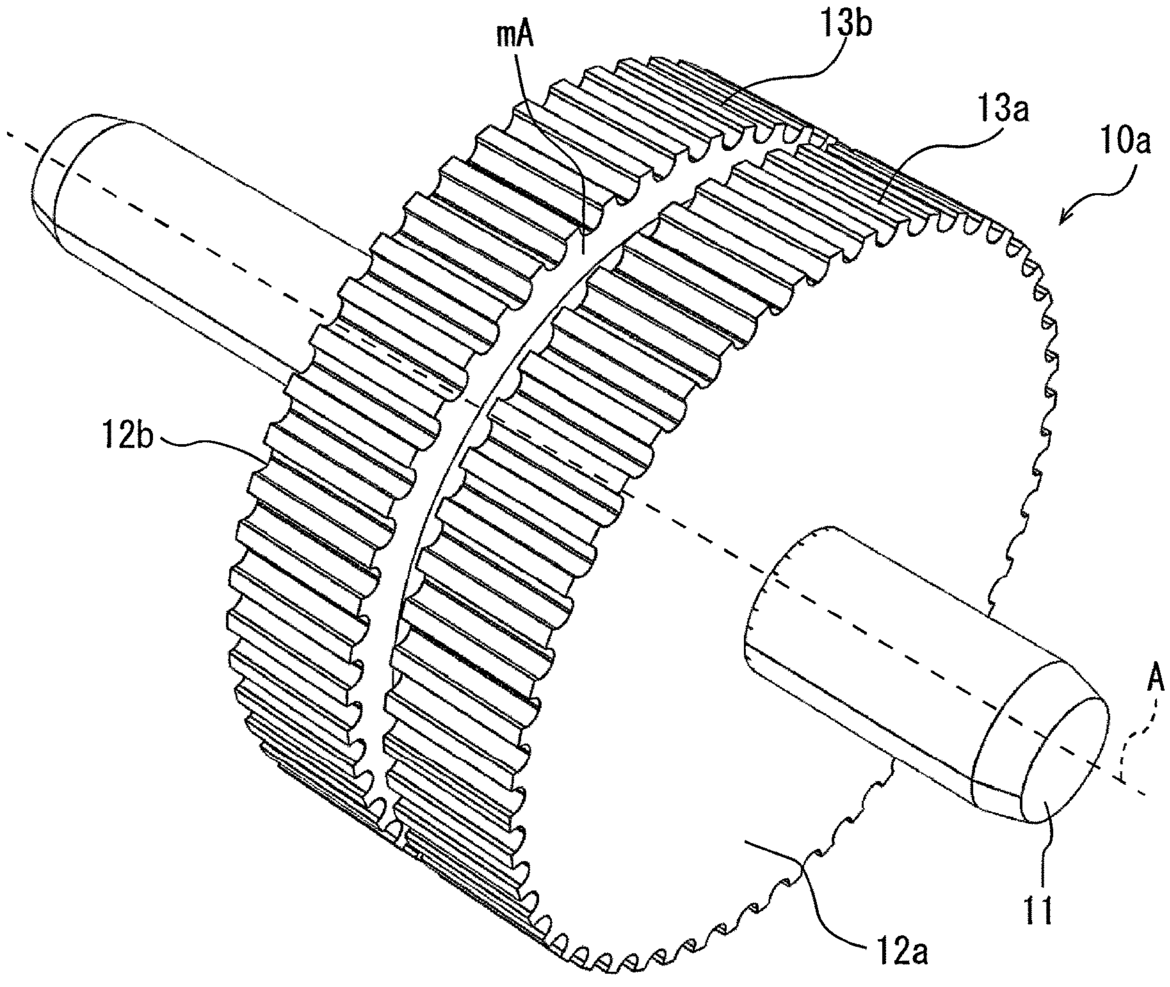
FIG. 4 is a perspective view of the rotor.
Figure 5:
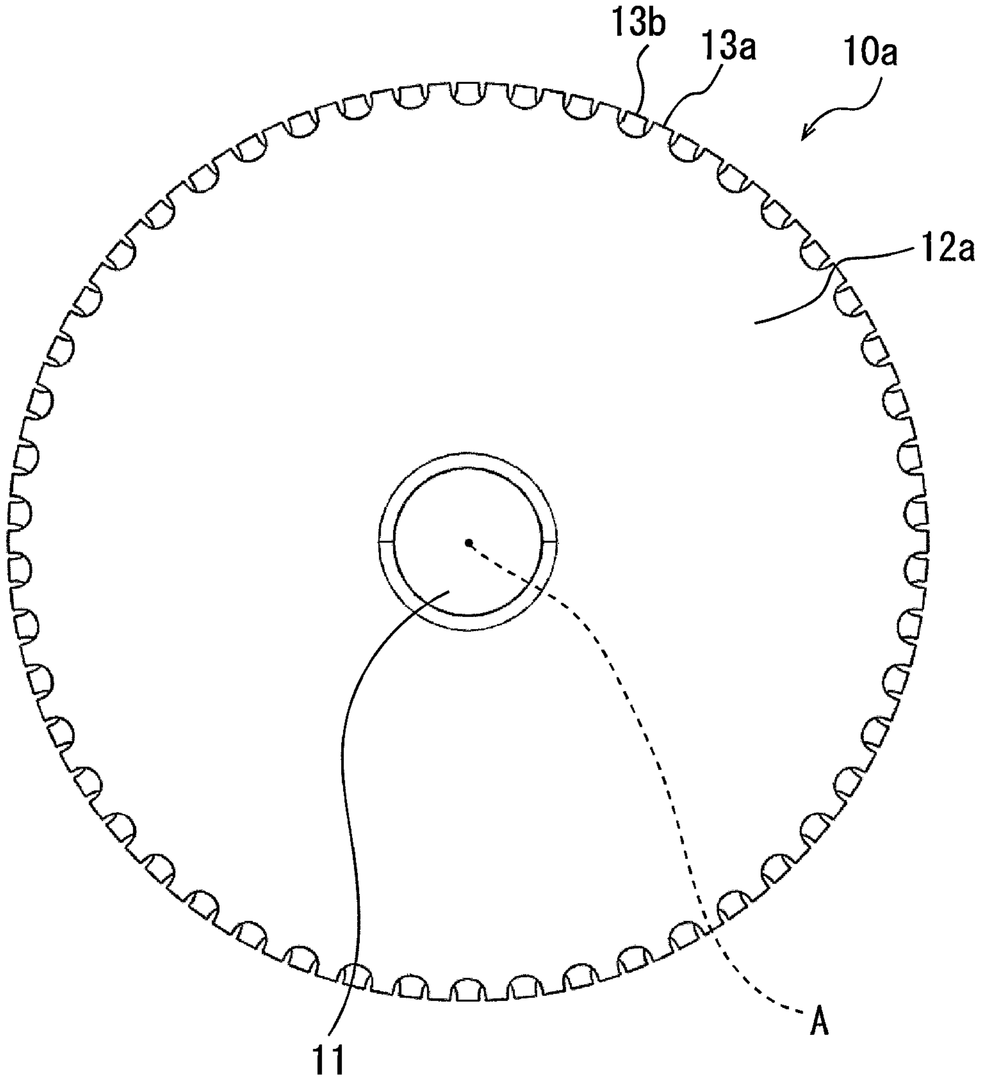
FIG. 5 is a view of the rotor as viewed in a direction of an axis.

FIG. 3 is a side view of the rotor 10*a*. FIG. 4 is a perspective view of the rotor 10*a*. FIG. 5 is a view of the rotor 10*a* as viewed in the direction of the axial center A. The rotor 10*a* includes a shaft 11, iron cores 12*a* and 12*b*, and a permanent magnet mA. The permanent magnets mA are disposed between the iron cores 12*a* and 12*b* and are in contact with the iron cores 12*a* and 12*b*. The iron cores 12*a* and 12*b* and the permanent magnets mA are each in the shape of a circular plate. The permanent magnet mA is magnetized to have different polarities in the direction of the axial center A. Thus, the polarity of the iron core 12*a* and the polarity of the iron core 12*b* are different from each other. For example, the iron core 12*a* is magnetized to the S pole, and the iron core 12*b* is magnetized to the N pole. The permanent magnet mA is an example of a first permanent magnet.

A plurality of pole teeth 13*a* are formed at a predetermined pitch on the outer circumferential surface of the iron core 12*a*. A plurality of pole teeth 13*b* are formed at a predetermined pitch on the outer circumferential surface of the iron core 12*b*. Herein, the pitch of the pole teeth 13*a* and the pitch of the pole teeth 13*b* are the same. The iron core 12*a* and the iron core 12*b* are fixed to the shaft 11 with a deviation of half the pitch. Therefore, as illustrated in FIG. 5, when viewed in the direction of the axial center A, the pole tooth 13*a* is positioned between the adjacent pole teeth 13*b*. Similarly, the pole tooth 13*b* is positioned between the adjacent pole teeth 13*a*.

The stator core 30*a* illustrated in FIG. 2 is formed by stacking a plurality of thin plates made of electromagnetic steel sheets in the thickness-wise direction. The stator core 30*a* includes a yoke portion 31 and tooth portions 33*a* to 33*h*. The yoke portion 31 has a substantially annular shape surrounding the rotor 10*a*. The yoke portion 31 includes an outer circumferential surface 311 and an inner circumferential surface 312. The outer circumferential surface 311 has a substantially rectangular shape when viewed in the direction of the axial center A. If the tooth portions 33*a* to 33*h* are not present in the yoke portion 31, the inner circumferential surface 312 has a substantially circular shape when viewed in the direction of the axial center A.

The tooth portions 33*a* to 33*h* protrude radially inward from the inner circumferential surface 312 of the yoke portion 31. Therefore, each tip of the tooth portions 33*a* to 33*h* faces the outer circumferential surface of the rotor 10*a*. The tooth portions 33*a* to 33*h* are provided at equal angular intervals in the circumferential direction. FIG. 2 illustrates center lines La to Lh of the tooth portions 33*a* to 33*h*, respectively. The center lines La to Lh pass through the axial center A and are parallel to the radial direction. The center lines La to Ld are the same as the center lines Le to Lh, respectively. The coils Ca to Ch are wound around the tooth portions 33*a* to 33*h* via an insulator not illustrated, respectively. When the coils Ca to Ch are energized, magnetic fluxes are generated to the yoke portion 31 and the tooth portions 33*a* to 33*h*, which are main magnetic paths.

The permanent magnets Ma to Mh are provided on the yoke portion 31 near the root sides of the tooth portions 33*a* to 33*h*, respectively. The permanent magnets Ma to Mh are provided at positions overlapping the center lines La to Lh, respectively. The permanent magnets Ma to Mh are located radially outward of the coils Ca to Ch, respectively. The permanent magnets Ma to Mh are inserted into a plurality of holes formed in advance in the stator core 30*a*. The permanent magnets Ma to Mh have the same size and shape. In each of the permanent magnets Ma to Mh, one of the S pole and the N pole faces radially inward, and the other of the S pole and the N pole faces radially outward. Specifically, each of the permanent magnets Ma, Mb, Me, and Mf has the N pole facing radially inward and the S pole facing radially outward. In each of the permanent magnets Mc, Md, Mg, and Mh, the S pole faces the inner side in the radial direction, and the N pole faces the outer side in the radial direction. In other words, the polarities of the radially inner sides of the two permanent magnets opposed to each other with the axial center A interposed therebetween are the same. Each of the permanent magnets Ma to Mh is an example of a second permanent magnet. Each of the permanent magnets Ma to Mh and the yoke portion 31 correspond to a second element. The stator core 30*a* therefore includes eight second elements.

When the coils Ca to Ch are in a non-energized state in which no current is applied, the tooth portions 33*a*, 33*b*, 33*e*, and 33*f* are magnetized to the N pole by the permanent magnets Ma, Mb, Me, and Mf. Similarly, the tooth portions 33*c*, 33*d*, 33*g*, and 33*h* are magnetized to the S pole by the permanent magnets Mc, Md, Mg, and Mh.

Figure 6:
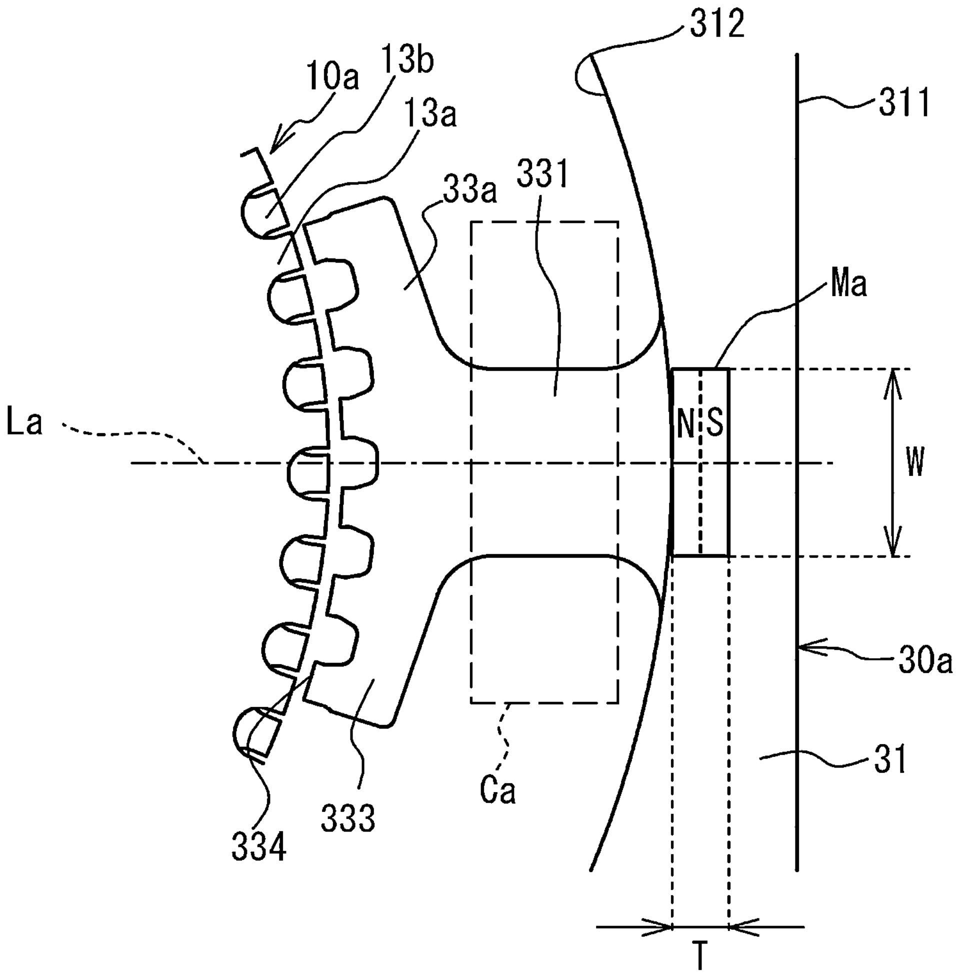
FIG. 6 is a partially enlarged view of FIG. 2.

FIG. 6 is a partially enlarged view of FIG. 2. The tooth portion 33*a* will be described as an example. The tooth portion 33*a* includes a rod portion 331 and a flange portion 333. The rod portion 331 extends radially inward from the inner circumferential surface 312 of the yoke portion 31, and has a substantially constant width in a direction perpendicular to the center line La. The flange portion 333 is continuous with the rod portion 331 radially inward and is circumferentially larger than the rod portion 331. A plurality of pole teeth 334 are formed in the circumferential direction on the surface of the flange portion 333 facing the rotor 10*a*. To be specific, six pole teeth 334 are formed in each of the tooth portions 33*a* to 33*h*. The pitch of the pole teeth 334 is narrower than each pitch of the pole teeth 13*a* and 13*b*. The pole teeth 334 are an example of stator pole teeth.

The coil Ca is wound around the rod portion 331.

A case where the coils Ca to Ch are in the non-energized state will be described. A illustrated in FIG. 6, the pole teeth 13*a* face the pole teeth 334 of the tooth portion 33*a* in the radial direction in a state of being slightly shifted in the clockwise direction. The tooth portion 33*a* is magnetized to the N pole, and the pole teeth 13*a* are magnetized to the S pole. Therefore, a magnetic circuit is formed therebetween, and attractive force is generated therebetween. That is, the tooth portion 33*a* applies counterclockwise force and radially outward force to the rotor 10*a*. Similarly, the pole teeth 13*a* face the pole teeth 334 of the tooth portion 33*b* in the radial direction in a state of being slightly shifted in the counterclockwise direction. Therefore, the tooth portion 33*b* applies clockwise force and radially outward force to the rotor 10*a*. Herein, the counterclockwise force and the clockwise force is canceled out.

Similarly, the counterclockwise force that acts on the rotor 10*a* by the tooth portion 33*c* and the clockwise force that acts on the rotor 10*a* by the tooth portion 33*d* cancel each other out. The same applies to the tooth portions 33*e* to 33*h*.

As a result, the rotor 10*a* is subjected to a radially outward force, and the rotor 10*a* is maintained in a stopped state. As described above, when the coils Ca to Ch are in the non-energized state, the rotor 10*a* and the stator core 30*a* are restrained such that the relative positional relationship therebetween is not changed. That is, a brake acts on the rotor 10*a*.

Similarly, a state is assumed in which the rotor 10*a* is shifted from the state of FIG. 2 by half of the pitch of each of the pole teeth 13*a* and 13*b*. In this case, the pole teeth 13*b* face the pole teeth 334 of the tooth portion 33*a* in the radial direction in a state of being slightly shifted in the clockwise direction. Therefore, the tooth portion 33*a* applies clockwise force and radially outward force to the rotor 10*a*. Similarly, the pole teeth 13*b* face the pole teeth 334 of the tooth portion 33*b* in the radial direction in a state of being slightly shifted in the counterclockwise direction. Therefore, the tooth portion 33*b* applies counterclockwise force and radially outward force to the rotor 10*a*. The clockwise force and the counterclockwise force cancel each other out. The same applies to the tooth portions 33*c* to 33*h*. Therefore, even when the rotor 10*a* is shifted by a half pitch from the state illustrated in FIG. 2, the brake acts on the rotor 10*a* in the non-energized state. As described above, the rotor 10*a* is stopped at a position shifted from the position illustrated in FIG. 2 by half the pitch of each of the pole teeth 13*a* and 13*b*.

In this way, when the coils Ca to Ch are in the non-energized state, the rotor 10*a* is stopped and held. Therefore, when the rotary electric machine 1*a* is used for an application in which the standby time during which the rotor 10*a* is stopped is long, the power consumption is suppressed. Further, for example, the rotor 10*a* is stopped even when the power supply is lost, providing good safety. In addition, by forming a plurality of holes in the stator core 30*a* and inserting the permanent magnets Ma to Mh into the plurality of holes, respectively, it is possible to provide a function of stopping the rotor 10*a* without energizing the stator core 30*a*. Therefore, an increase in the manufacturing cost of the rotary electric machine 1*a* is suppressed. Further, as compared with a case where the rotor 10*a* is stopped by using, for example, a friction brake mechanism, the rotary electric machine 1*a* does not require a movable part or a wear part and is good in durability. Further, the rotor 10*a* is stopped at every half of the pitch of each of the pole teeth 13*a* and 13*b*, and the resolution of the stopped position is improved.

In addition, when all the coils Ca to Ch are set to the energized state to cancel the magnetic fluxes of the permanent magnets Ma to Mh, the attraction force between the rotor 10*a* and the stator core 30*a* is released. Thus, the rotor 10*a* is in a free rotation state in which the rotor 10*a* freely rotates. Furthermore, by individually setting the energization of the coils Ca to Ch to the energized state and the non-energized state, it is also possible to apply a brake weaker than the brake applied when the coils Ca to Ch are non-excited. For example, only four coils Ca, Cc, Ce, and Cg among the coils Ca to Ch are excited. The currents of the coils Ca to Ch may be individually set to an intermediate amount between the energized state and the non-energized state. For example, the currents of the four coils Cb, Cd, Cf, and Ch among the coils Ca to Ch are set to 50% of the current in the energized state in which the coils do not act as a brake, and the currents of the other four coils are set to 100%. In this way, the action of the brake is adjusted by individually changing the energization of the coils Ca to Ch.

By controlling the energization of the coils Ca to Ch, the rotor 10*a* is rotated in addition to adjusting the action of the brake. For example, in the state of FIG. 2, the coils Cb, Cd, Cf, and Ch are set to the non-energized state, and the coils Ca, Cc, Ce, and Cg are set to the energized state so as to cancel the magnetic fluxes of the permanent magnets Ma, Mc, Me, and Mg. As a result, the attraction force between each of the tooth portions 33*a*, 33*c*, 33*e*, and 33*g* and the rotor 10*a* is released, and the rotor 10*a* rotates clockwise.

In a state where the rotor 10*a* is shifted from the state of FIG. 2 by half of each pitch of the pole teeth 13*a* and 13*b*, the coils Ca, Cc, Ce, and Cg are set to the non-energized state, and the coils Cb, Cd, Cf, and Ch are set to the energized state so as to cancel the magnetic fluxes of the permanent magnets Mb, Md, Mf, and Mh. As a result, the attraction force between each of the tooth portions 33*b*, 33*d*, 33*f*, and 33*h* and the rotor 10*a* is released, and the rotor 10*a* rotates clockwise. By switching between the non-energized state and the energized state at a predetermined timing in this way, the rotation of the rotor 10*a* is continued.

The coils Ca to Ch may be reversely excited so as to strengthen the magnetic flux of each of the permanent magnets Ma to Mh. This may further increase the interactive force, which is the attraction force between the rotor 10*a* and the stator core 30*a*, compared to the non-energized state. This makes it possible to more strongly restrain the rotor 10*a* and the stator core 30*a*.

The tooth portion 33*a* is formed symmetrically with respect to the center line La. As described above, the permanent magnet Ma is provided at a position overlapping the center line La. In FIG. 6, a thickness T and a width W of the permanent magnet Ma are illustrated. The thickness T is the thickness of the permanent magnet Ma in a direction parallel to the center line La. The width W is the width of the permanent magnet Ma in a direction perpendicular to the center line La. As illustrated in FIG. 6, the width W is longer than the thickness T. Thus, the permanent magnet Ma is provided at a position overlapping the center line La, and the width W is longer than the thickness T. Therefore, magnetic short-circuiting of the rod portion 331, which serve as a magnetic path for a magnetic flux of the permanent magnet Ma, is reduced, and thus the magnetic force of the permanent magnet Ma is efficiently applied to the rotor 10*a*. Thus, the rotor 10*a* is stopped and held. Each length of the permanent magnets Ma to Mh in the direction parallel to the axial center A is substantially the same as the thickness of the stator core 30*a* in the direction parallel to the axial center A.

Similarly to the permanent magnet Ma, the permanent magnets Mb to Mh are provided at positions overlapping the center lines Lb to Lh, respectively, and the width of each of the permanent magnets Mb to Mh is longer than the thickness thereof. As described above, the magnetic force of the permanent magnets Ma to Mh is efficiently applied to the rotor 10*a* to stop the rotor 10*a*.

The permanent magnets Ma to Mh are separated from the coils Ca to Ch, respectively, to the outside in the radial direction. Therefore, even after the coils Ca to Ch are wound around the stator core 30*a*, the permanent magnets Ma to Mh are inserted into the respective holes of the stator core 30*a*. This improves the workability of assembling the rotary electric machine 1*a*.

Figure 7:
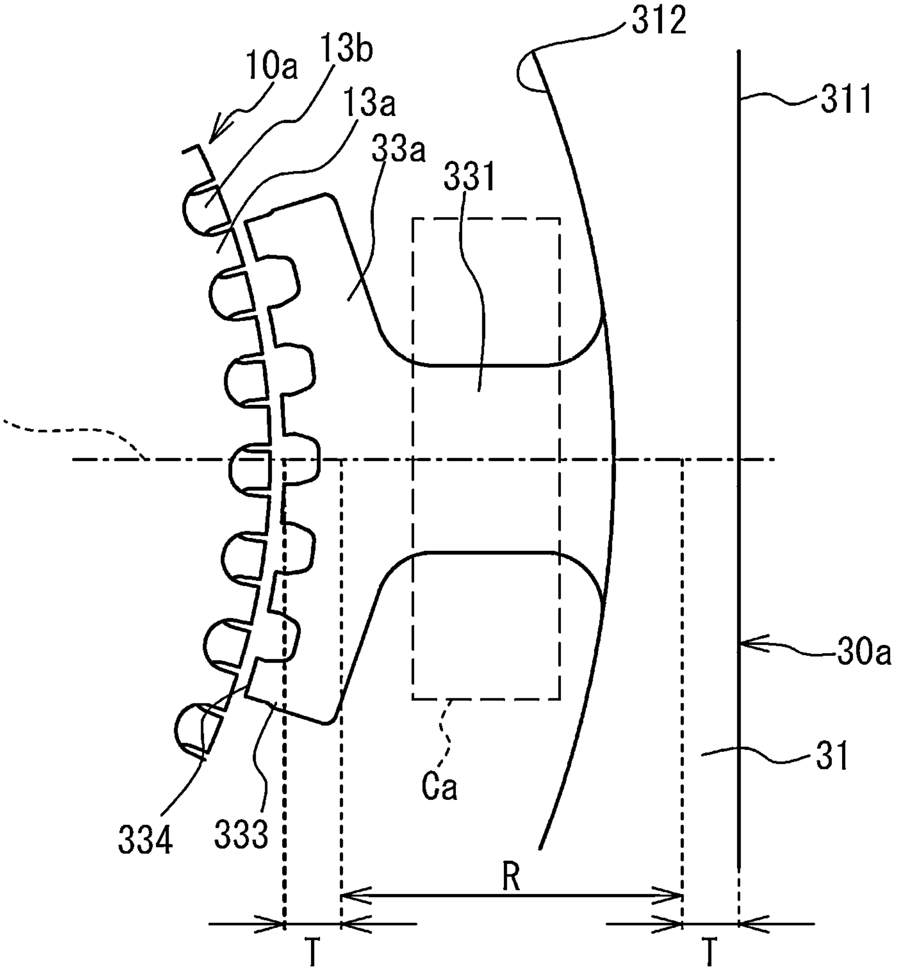
FIG. 7 is an explanatory view of positions where a permanent magnet is capable of being installed.

FIG. 7 is an explanatory view of a position where the permanent magnet Ma is installed. FIG. 7 illustrates the thickness T of the permanent magnet Ma from the distal end surface of the flange portion 333, the thickness T of the permanent magnet Ma from the outer circumferential surface 311 of the yoke portion 31, and an installable range R. The installable range R is exemplified as a length obtained by excluding the thickness T from the distal end surface of the flange portion 333 and the thickness T from the outer circumferential surface 311 from the length from the distal end surface of the flange portion 333 to the outer circumferential surface 311 in the direction of the center line La. The permanent magnet Ma is provided within the installable range R. In other words, the permanent magnet Ma is separated from the distal end surface of the flange portion 333 outward in the radial direction by the thickness T of the permanent magnet Ma or more, and is separated from the outer circumferential surface 311 inward in the radial direction by the thickness T of the permanent magnet Ma or more. Thus, the magnetic force of the permanent magnets Ma is efficiently applied to the rotor 10*a* by using the stator core 30*a*, and the strength of the stator core 30*a* is also ensured.

The above-described condition is also satisfied for the permanent magnets Mb to Mh. That is, the permanent magnets Mb to Mh are respectively separated from the distal end surfaces of the tooth portions 33*b* to 33*h* outward in the radial direction by the thickness T or more, and are respectively separated from the outer circumferential surface 311 inward in the radial direction by the thickness T or more. Therefore, the magnetic force of the permanent magnets Mb to Mh is efficiently applied to the rotor 10*a* by using the stator core 30*a*, and the strength of the stator core 30*a* is also ensured.

Figure 8:
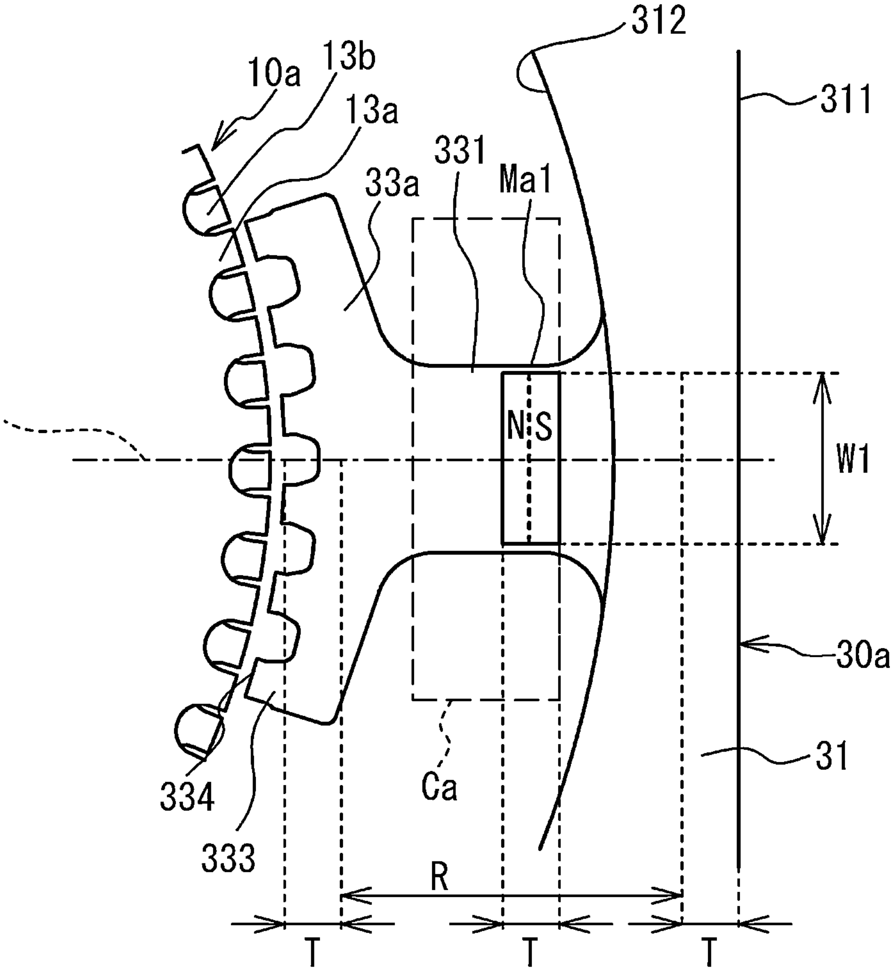
FIG. 8 is a view illustrating a first modification of a position of the permanent magnet.

FIG. 8 is a view illustrating a first modification of the position of the permanent magnet. FIG. 8 corresponds to FIG. 6. A width W1 of a permanent magnet Ma1 illustrated in FIG. 8 is narrower than the width W of the permanent magnet Ma described above, but the thickness T is the same. The permanent magnet Ma1 is provided at a position overlapping the coil Ca. The permanent magnets Mb to Mh may be provided at the same positions as the permanent magnet Ma1 in FIG. 8.

Figure 9:
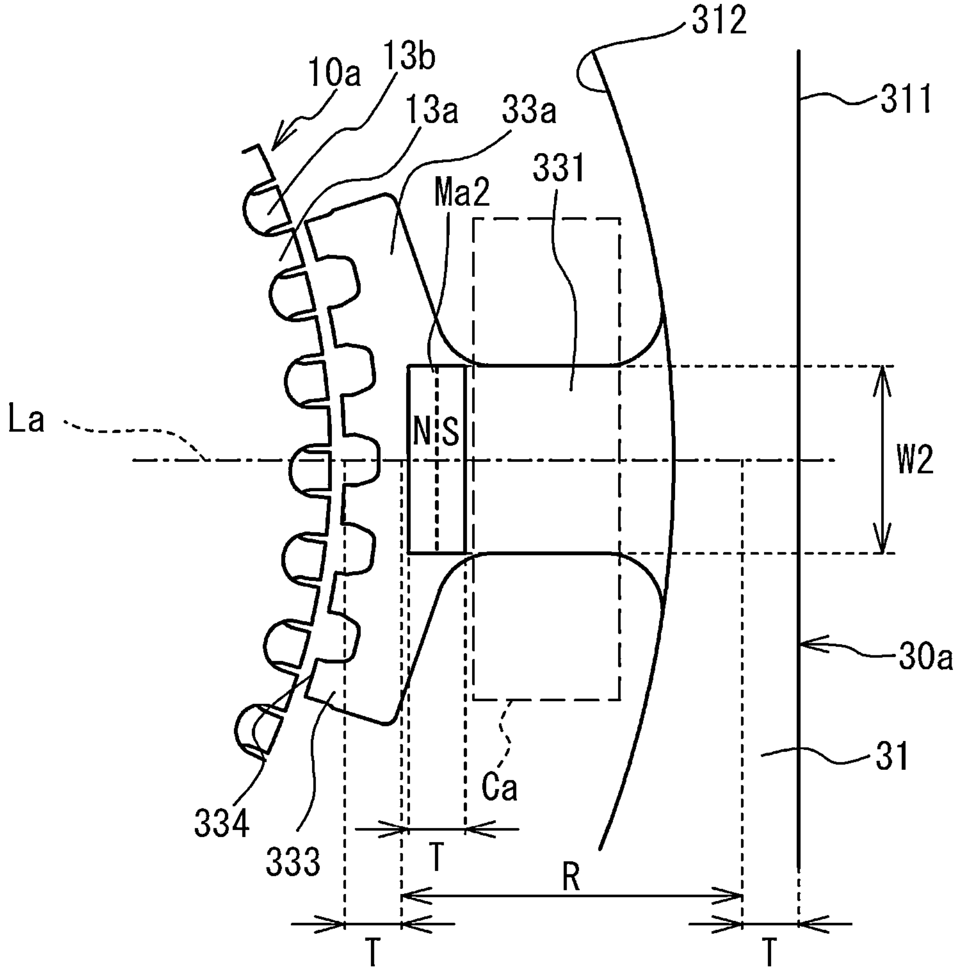
FIG. 9 is a view illustrating a second modification of a position of the permanent magnet.

FIG. 9 is a view illustrating a second modification of the position of the permanent magnet. FIG. 9 corresponds to FIG. 6. A width W2 of the permanent magnet Ma2 illustrated in FIG. 9 is narrower than the width W of the permanent magnet Ma, but the thickness T is the same. The permanent magnet Ma2 is provided radially inside the coil Ca. The permanent magnets Mb to Mh may be provided at the same positions as the permanent magnet Ma2 in FIG. 9.

[Configuration of First Modification of Rotary Electric Machine]

Figure 10:
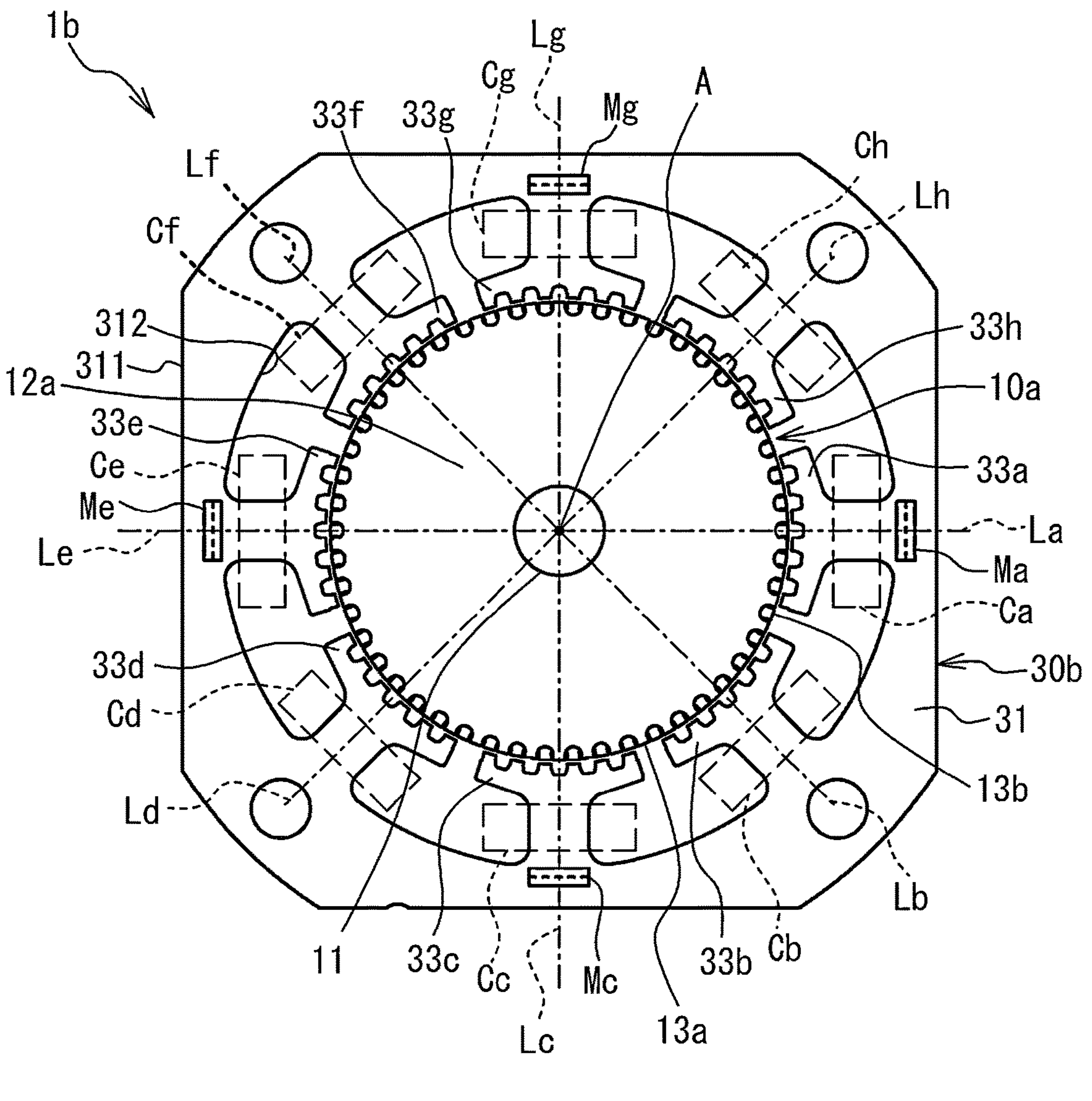
FIG. 10 is an external view of a first modification of the rotary electric machine.
Figure 11:
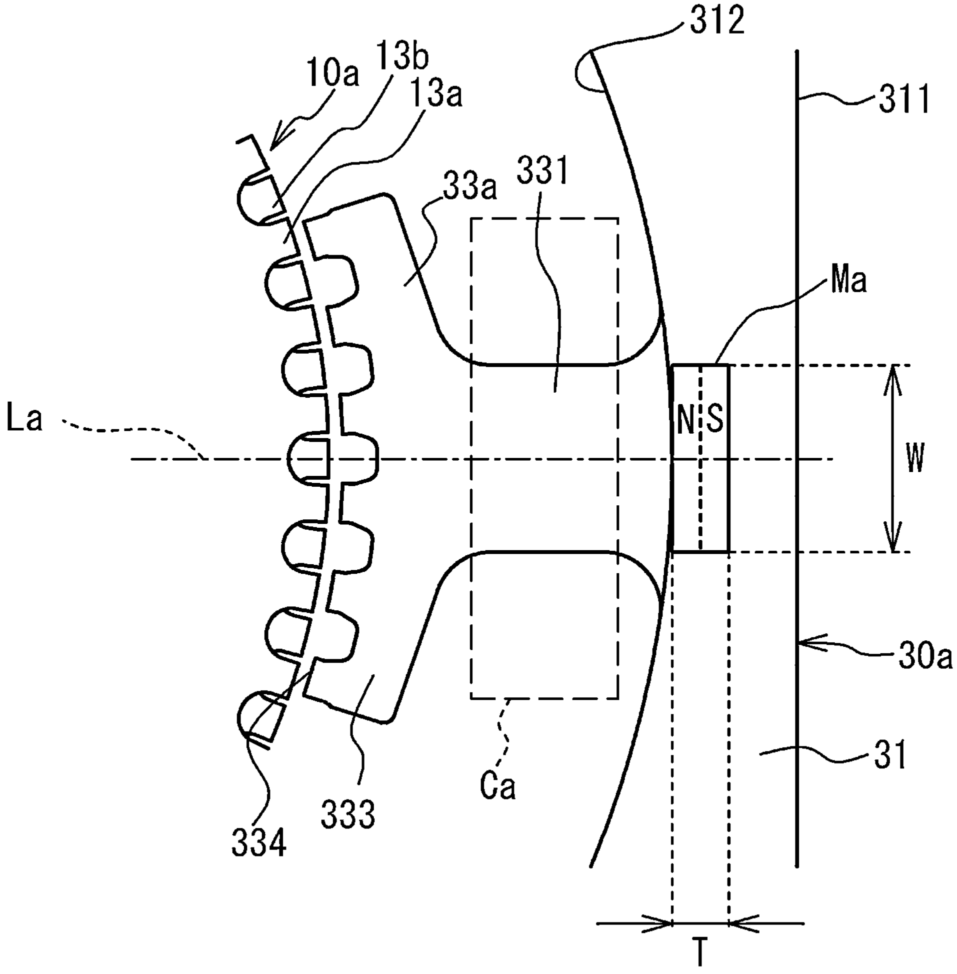
FIG. 11 is a partially enlarged view of FIG. 10.

FIG. 10 is an external view of a first modification of the rotary electric machine. FIG. 10 corresponds to FIG. 2. A rotary electric machine 1*b* is different from the above-described rotary electric machine 1*a* in that four permanent magnets Ma, Mc, Me, and Mg are provided in a stator core 30*b*. Therefore, the stator core 30*b* of the rotary electric machine 1*b* is reduced in manufacturing cost as compared with the above-described stator core 30*a* provided with the eight permanent magnets Ma to Mh. FIG. 11 is a partially enlarged view of FIG. 10. FIG. 11 corresponds to FIG. 6.

A case where the coils Ca to Ch are in the non-energized state will be described. As illustrated in FIG. 11, the pole teeth 13*a* face the pole teeth 334 of the tooth portion 33*a* in the radial direction. The teeth portion 33*a* is magnetized to the N pole, and the pole teeth 13*a* are magnetized to the S pole. Therefore, a magnetic circuit is formed therebetween, and attractive force is generated. The same applies to the tooth portion 33*e*. In this state, regarding the tooth portions 33*c* and 33*g*, the pole teeth 13*b* and the pole teeth 334 face each other in the radial direction. The tooth portions 33*c* and 33*g* are magnetized to the S pole, and the pole teeth 13*b* are magnetized to the N pole. Therefore, a magnetic circuit is formed therebetween, and attractive force is generated. As a result, a brake acts on the rotor 10*a*. Further, the coils Ca, Cc, Ce, and Cg may be set to the reverse energized state so as to strengthen the magnetic fluxes of the permanent magnets Ma, Mc, Me, and Mg.

The stator core 30*a* is provided with the permanent magnets Ma to Mh, and the stator core 30*b* is provided with four permanent magnets Ma, Mc, Me, and Mg, but the present disclosure is not limited thereto. For example, only one of the permanent magnets Ma to Mh may be provided. Further, only two of the permanent magnets Ma to Mh may be provided so as to face each other with the axial center A interposed therebetween. For example, only the permanent magnets Ma and Me may be provided.

[Configuration of Second Modification of Rotary Electric Machine]

Figure 12:
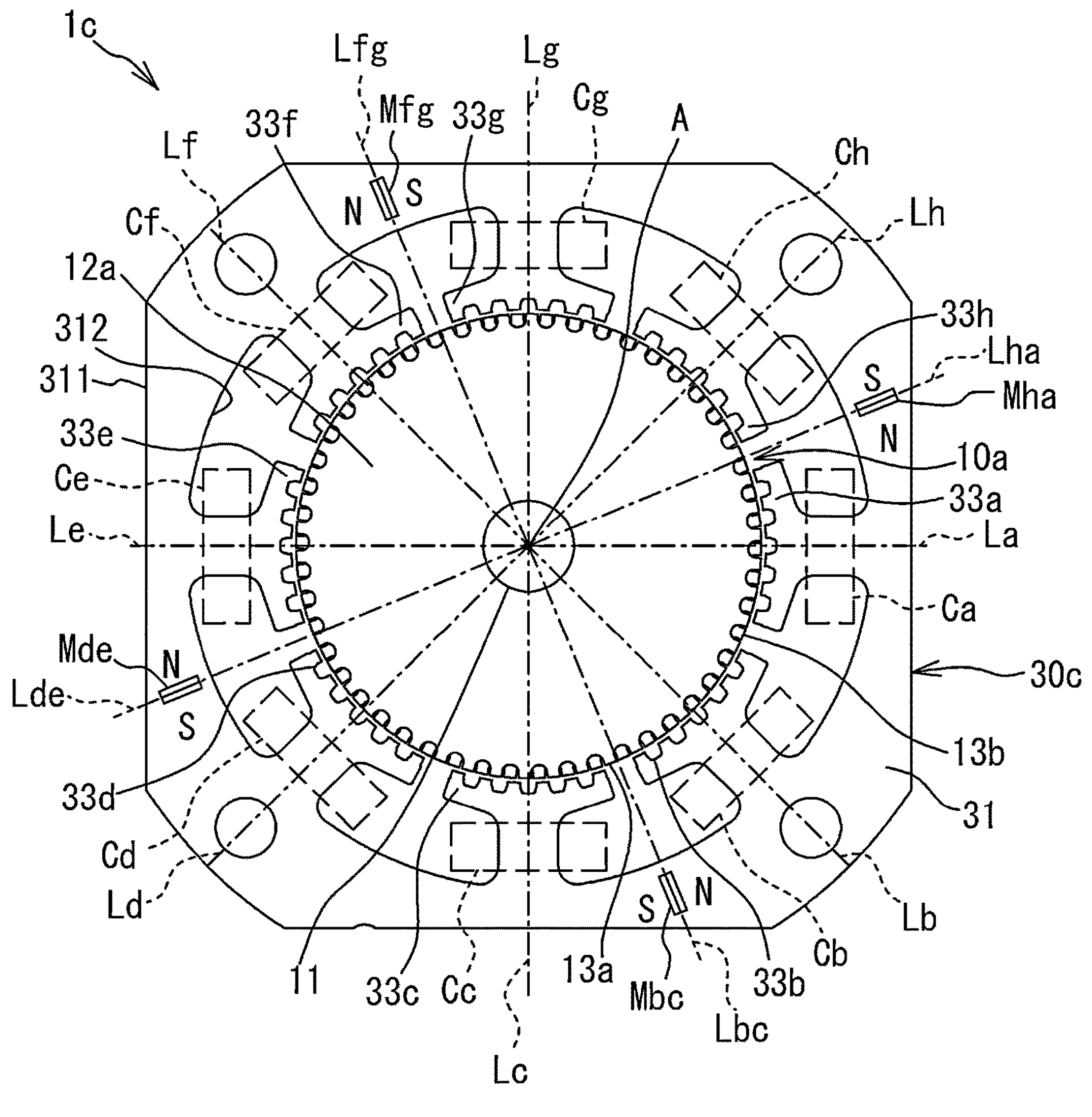
FIG. 12 is an external view of a second modification of the rotary electric machine.

FIG. 12 is an external view of a second modification of the rotary electric machine. FIG. 12 corresponds to FIG. 2. A rotary electric machine 1*c* is different from the above-described rotary electric machine 1*a* in that four permanent magnets Mha, Mbc, Mde, and Mfg are provided in the yoke portion 31 of a stator core 30*c*. The permanent magnet Mha is provided in the yoke portion 31 between the tooth portions 33*h* and 33*a* in the circumferential direction. The permanent magnet Mbc is provided in the yoke portion 31 between the tooth portions 33*b* and 33*c* in the circumferential direction. The permanent magnet Mde is provided in the yoke portion 31 between the tooth portions 33*d* and 33*e* in the circumferential direction. The permanent magnet Mfg is provided in the yoke portion 31 between the tooth portions 33*f* and 33*g* in the circumferential direction.

FIG. 12 illustrates division lines Lha, Lbc, Lde, and Lfg that pass through the axial center A and are parallel to the radial direction. The permanent magnets Mha, Mbc, Mde, and Mfg are provided at positions overlapping the division lines Lha, Lbc, Lde, and Lfg, respectively. The division line Lha passes through the middle of the adjacent center lines Lh and La. The division line Lbc passes through the middle between the adjacent center lines Lb and Lc. The division line Lde passes through the middle between the adjacent center lines Ld and Le. The division line Lfg passes through the middle between the adjacent center lines Lf and Lg. The division lines Lha and Lbc are the same as the division lines Lde and Lfg, respectively. Therefore, the angle between the division line Lha and the center line Lh, the angle between the division line Lha and the center line La, the angle between the division line Lbc and the center line Lb, the angle between the division line Lbc and the center line Lc, the angle between the division line Lde and the center line Ld, the angle between the division line Lde and the center line Le, the angle between the division line Lfg and the center line Lf, and the angle between the division line Lfg and the center line Lg are the same.

In each of the permanent magnets Mha, Mbc, Mde, and Mfg, one of the S pole and the N pole faces one side in the circumferential direction, and the other of the S pole and the N pole faces the other side in the circumferential direction. Specifically, the N pole of each of the permanent magnets Mha and Mde is oriented in the clockwise direction, and the S pole thereof is oriented in the counterclockwise direction. In each of the permanent magnets Mbc and Mfg, the N pole is oriented in the counterclockwise direction, and the S pole is oriented in the clockwise direction.

In a non-energized state in which the coils Ca to Ch are not energized, the tooth portions 33*h* and 33*a* are magnetized to the S pole and the N pole, respectively, by the permanent magnet Mha. Similarly, the tooth portions 33*b* and 33*c* are magnetized to the N pole and the S pole by the permanent magnet Mbc, the tooth portions 33*d* and 33*e* are magnetized to the S pole and the N pole by the permanent magnet Mde, and the tooth portions 33*f* and 33*g* are magnetized to the N pole and the S pole by the permanent magnet Mfg. In this way, one permanent magnet magnetizes two tooth portions. Therefore, the stator core 30*c* of the rotary electric machine 1*c* is reduced in manufacturing cost as compared with the above-described stator core 30*a* provided with the eight permanent magnets Ma to Mh.

Figure 13:
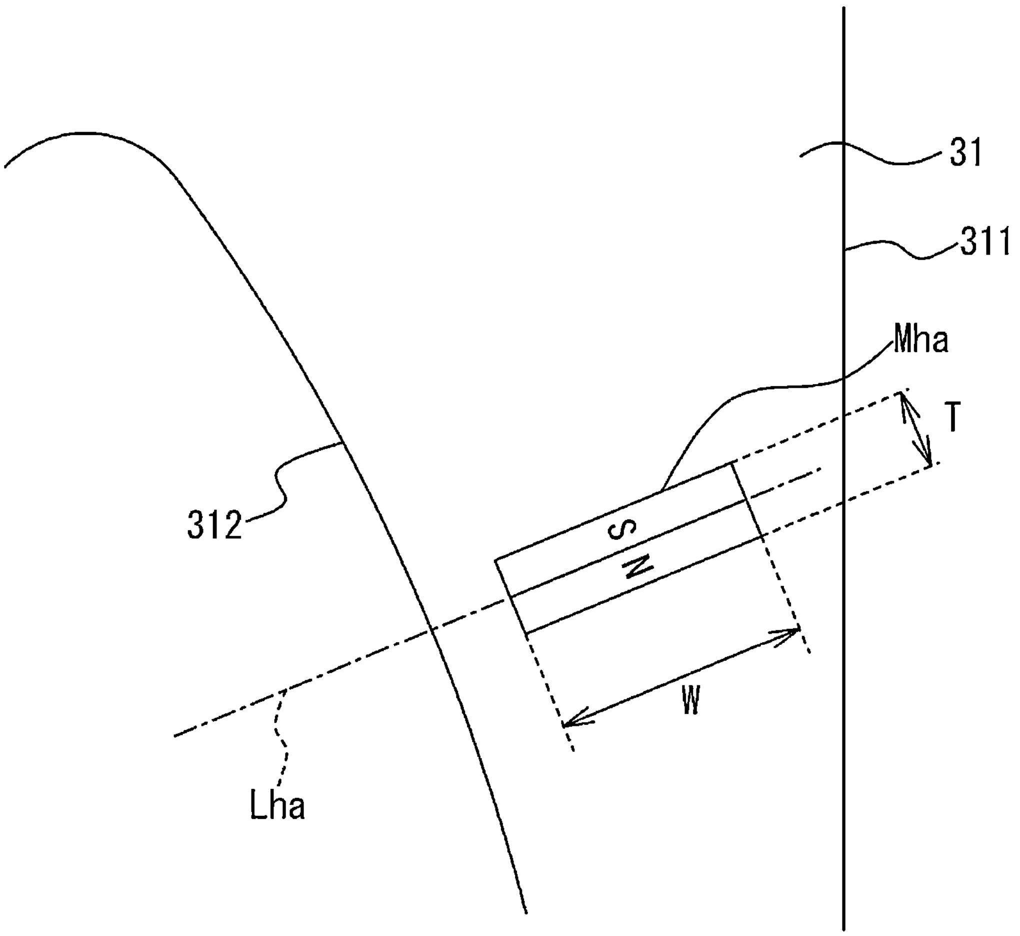
FIG. 13 is a partially enlarged view of FIG. 12.

FIG. 13 is a partially enlarged view of FIG. 12.

The permanent magnet Mha will be described as an example. The thickness T is the thickness of the permanent magnet Mha in a direction perpendicular to the division line Lha. The width W is the width of the permanent magnet Mha in a direction parallel to the division line Lha. The permanent magnet Mha is provided such that the boundary line between the S pole and the N pole of the permanent magnet Mha overlaps the division line Lha.

Thus, the tooth portions 33*h* and 33*a* are efficiently magnetized to different polarities by the permanent magnet Mha. The same applies to the permanent magnets Mbc, Mde, and Mfg.

The stator core 30*c* is provided with the permanent magnets Mha, Mbc, Mde, and Mfg, but the present disclosure is not limited thereto. For example, only one of the permanent magnets Mha, Mbc, Mde, and Mfg may be provided. Alternatively, only two of the permanent magnets Mha, Mbc, Mde, and Mfg may be provided so as to face each other with the axial center A interposed therebetween. For example, only the permanent magnets Mha and Mde may be provided.

[Configuration of Third Modification of Rotary Electric Machine]

Figure 14:
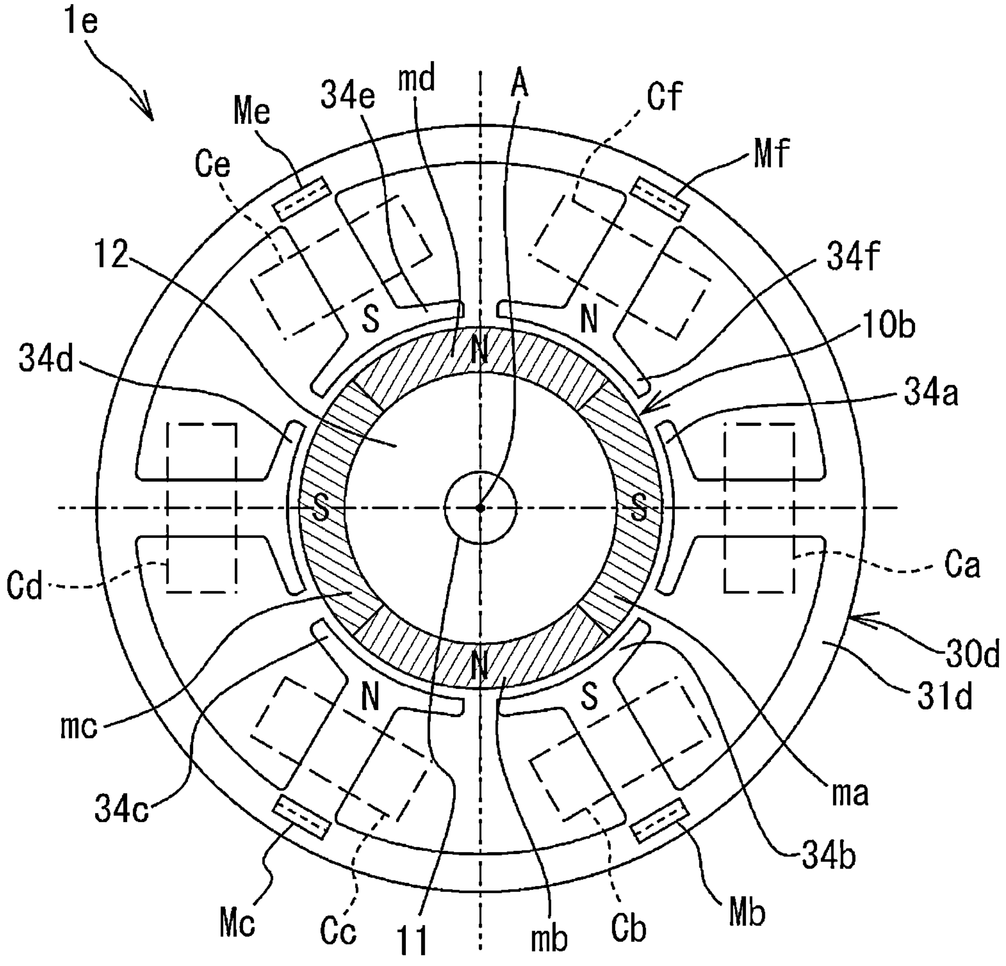
FIG. 14 is an external view of a third modification of the rotary electric machine.

FIG. 14 is an external view of a third modification of the rotary electric machine. FIG. 14 corresponds to FIG. 2. A rotary electric machine 1*e* is a synchronous motor. A rotor 10*b* includes the shaft 11, an iron core 12, and permanent magnets ma to md. An iron core 12 has a cylindrical shape. The shaft 11 is inserted into a hole at the center of the iron core 12, and the iron core 12 is fixed to the shaft 11. The rotor 10*b* is rotatably supported by the shaft 11. The rotor 10*b* is of the inner rotor type.

The permanent magnets ma to md are provided on the outer circumferential surface of the iron core 12. Each of the permanent magnets ma to md is formed in an arc shape. The permanent magnets ma to md have the same size and shape. In each of the permanent magnets ma to md, one of the S pole and the N pole faces inward in the radial direction, and the other of the S pole and the N pole faces outward in the radial direction. Specifically, each of the permanent magnets ma and mc has the N pole facing radially inward and the S pole facing radially outward. In each of the permanent magnets mb and md, the S pole faces radially inward, and the N pole faces radially outward. FIG. 14 illustrates only the outer polarities of the permanent magnets ma to md. In this way, the outer circumferential surface of the rotor 10*b* is magnetized to four polarities at equal intervals in the circumferential direction. Each of the permanent magnets ma to md is an example of a first permanent magnet. Each of the permanent magnets ma to md and the iron core 12 correspond to a first element. The rotor 10*b* therefore includes four first elements.

The stator core 30*d* includes a yoke portion 31*d* and tooth portions 34*a* to 34*f*. The permanent magnets Mb, Mc, Me, and Mf are provided on the yoke portion 31*d* of the stator core 30*d*. The permanent magnets Mb, Mc, Me, and Mf are provided at positions corresponding to tooth portions 34*b*, 34*c*, 34*e*, and 34*f*, respectively. When the coils Ca to Cf are in a non-energized state, the tooth portions 34*b*, 34*c*, 34*e*, and 34*f* are magnetized to the S pole, the N pole, the S pole, and the N pole, respectively. Thus, the rotor 10*b* is braked. Unlike the tooth portions 33*a* to 33*h* described above, the tooth portions 34*a* to 34*f* are not provided with pole teeth at the distal end portions.

Further, by controlling the energization of the coils Cb, Cc, Ce, and Cf, the magnetic fluxes of the permanent magnets Mb, Mc, Me, and Mf are canceled or increased at a predetermined timing, whereby rotational force is generated in the rotor 10*b*.

The rotor 10*b* described above has four different polarities in the circumferential direction, but the present disclosure is not limited thereto, and the rotor 10*b* may have magnetic poles of integer multiples of 2. For example, the outer circumferential surface of the rotor 10*b* may be magnetized to eight polarities at equal intervals in the circumferential direction. In this case, for example, the stator core 30*d* may include twelve tooth portions and a coil wound around each of the tooth portions.

Each of the stator cores 30*a*, 30*b*, and 30*c* includes eight tooth portions 33*a* to 33*h*, and the stator core 30*d* includes six tooth portions 34*a* to 34*f*. However, the number of tooth portions is not limited to this. In the case of the synchronous motor illustrated in FIG. 14, the brake position accuracy of the rotor is improved by increasing the number of poles of the rotor 10*b* and the number of slots of the stator core 30*a*.

The rotary electric machine including the electromagnetic brake has been described with reference to FIGS. 2 to 14, but the present disclosure is not limited thereto. The electromagnetic brake may not have the function of the rotary electric machine. That is, the electromagnetic brake may not have a purpose of rotating the rotor.

While the exemplary embodiments of the present disclosure have been illustrated in detail, the present disclosure is not limited to the above-mentioned embodiments, and other embodiments, variations and variations may be made without departing from the scope of the present disclosure.

What is claimed is:

1. An electromagnetic brake including Anan interaction force control device comprising:

- a first element including a first permanent magnet, the first element being a part of a rotor of a rotary electric machine; and
- a second element including a second permanent magnet and a coil, the second element being a part of a stator of the rotary electric machine,
- wherein;
- the coil is a stator winding of the rotary electric machine,
- a relative positional relationship between the first and second elements changes in a circumferential direction around an axis of the rotor,
- mutual magnetic force of the first and second permanent magnets generates interaction force between the first and second elements,
- magnetic force of the second permanent magnet is capable of increasing and decreasing in accordance with magnetic force generated by the coil,
- the interaction force is controlled by changing the magnetic force generated by the coil, and
- the second permanent magnet is oriented such that one of S pole and N pole of the second permanent magnet faces radially inward and the other pole faces radially outward, and
- when the coil is in a non-energized state, the rotor and the stator are restrained by the interaction force generated by a magnetic pull force between opposite polarities of the first and second permanent magnets.

2. The electromagnetic brake according to claim 1, wherein:

when the coil is in a non-energized state, the rotor and the stator are restrained by the interaction force such that the relative positional relationship between the first and second elements is invariable, and when the coil is in an energized state, the magnetic force generated by the coil and the magnetic force of the second permanent magnet cancel each other out, and the rotor and the stator are released from restraint by the interaction force.

3. The electromagnetic brake according to claim 2, wherein when the coil is in a reverse energized state, the interaction force increases and the rotor and stator are more strongly restrained than when the coil is in the non-energized state.

4. The electromagnetic brake according to claim 3, wherein the rotor is rotatable by controlling a direction and a magnitude of an energization current of the coil.

5. The electromagnetic brake according to claim 2, wherein the rotor includes a plurality of the first elements.

6. The electromagnetic brake according to claim 2, wherein the stator includes a plurality of the second elements.

7. The electromagnetic brake according to claim 2, wherein the second element includes: a stator core that is usable as a part of the rotary electric machine; and the second permanent magnet embedded into a hole that is formed in the stator core by processing.

8. A rotary electric machine comprising the electromagnetic brake according to claim 4, wherein the rotor is an inner rotor type, and includes: a shaft; first and second rotor cores fixed to the shaft; and the first permanent magnet disposed between the first and second rotor cores in a direction of the shaft and magnetized in the direction of the shaft, first rotor pole teeth are formed at a predetermined pitch on an outer circumferential surface of the first rotor core, second rotor pole teeth are formed at the predetermined pitch on an outer circumferential surface of the second rotor core, the first and second rotor pole teeth are circumferentially shifted from each other by half of the predetermined pitch, the stator includes a stator core around which the coil is wound, the stator core includes stator pole teeth, and a magnetic circuit is formable between the stator pole teeth and one of the first and second rotor pole teeth facing the stator pole teeth, and the rotor is rotatable by magnetic force generated between the stator pole teeth and one of the first and second rotor pole teeth facing the stator pole teeth by energization of the coil.

9. A rotary electric machine comprising the electromagnetic brake according to claim 4, wherein the rotor is an inner rotor type, and includes a rotor core provided with at least one of the first permanent magnet and having an outer circumferential surface with a number of magnetic poles that is an integral multiple of 2 and is equally spaced in the circumferential direction, the stator includes a stator core around which the coil is wound, the stator core includes stator pole teeth, a magnetic circuit is formable between the stator pole teeth and the magnetic pole of the rotor core facing the stator pole teeth, and the rotor is rotatable by magnetic force generated between the stator pole teeth and the magnetic pole of the rotor core facing the stator pole teeth by energization of the coil.

10. The rotary electric machine according to claim 8, wherein the stator core includes: a yoke portion having a substantially annular shape surrounding the rotor; and first and second tooth portions protruding radially inward from an inner circumferential surface of the yoke portion so as to be separated from each other in the circumferential direction, the coil includes first and second coils wound around the first and second tooth portions, respectively, and the second permanent magnet is provided on the first tooth portion, is separated outward in a radial direction from a distal end surface of the first tooth portion by a distance equal to or greater than a thickness of the second permanent magnet, and is separated inward in the radial direction from an outer circumferential end surface of the yoke portion by a distance equal to or greater than the thickness of the second permanent magnet.

11. The rotary electric machine according to claim 10, wherein the second permanent magnet is separated outward in the radial direction from the first coil.

12. The rotary electric machine according to claim 10, wherein at least a portion of the second permanent magnet overlaps the first coil.

13. The rotary electric machine according to claim 10, wherein the second permanent magnet is separated inward in the radial direction from the first coil.

14. The rotary electric machine according to claim 11, wherein the second permanent magnet is provided at a position overlapping a center line passing through the first tooth portion and parallel to the radial direction when viewed in a direction of the shaft, a width of the second permanent magnet in a direction orthogonal to the center line is larger than a thickness of the second permanent magnet in a direction parallel to the center line, one of magnetic poles of the second permanent magnet faces radially inward, and the other of the magnetic poles of the second permanent magnet faces radially outward.

15. The electromagnetic brake according to claim 1, wherein a central axis of the stator winding of the coil is a direction in which the S pole and the N pole of the second permanent magnet are arranged.

16. The electromagnetic brake according to claim 15, wherein the second permanent magnet is located radially outward of the coil.

17. The electromagnetic brake according to claim 15, wherein the second permanent magnet is located in a position overlapping the coil.

* * * * *